March 9, 1937.  J. K. LENCKE ET AL  2,072,954
STEERING STABILIZER
Filed Jan. 22, 1932
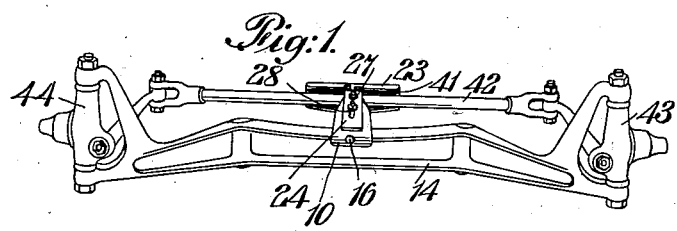
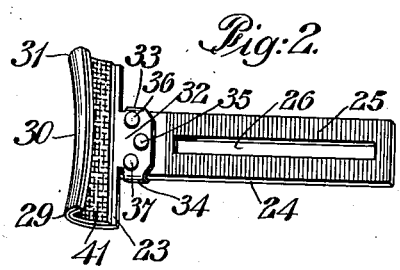
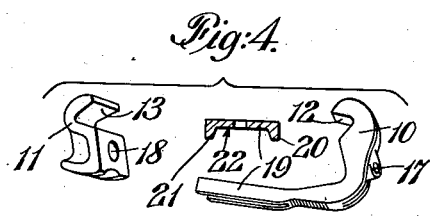
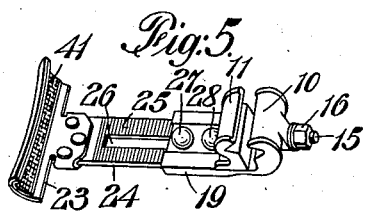
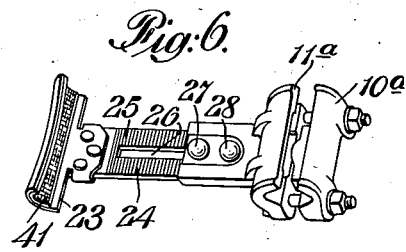
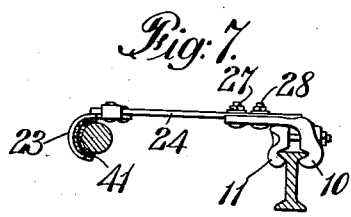
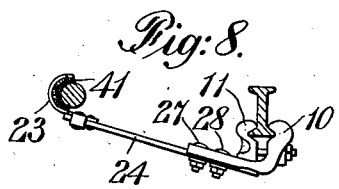
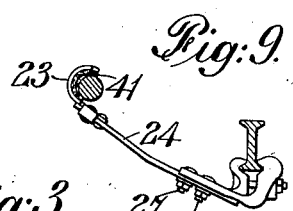
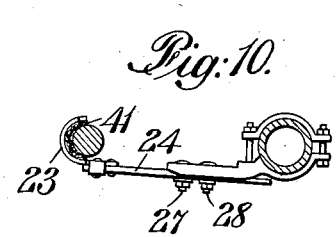
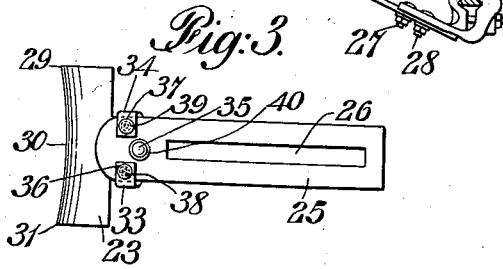
INVENTORS
John K. Lencke
Herman Schmid
BY
H. W. van Deventer
ATTORNEY Patented Mar. 9, 1937

2,072,954

UNITED STATES PATENT OFFICE 2,072,954

STEERING STABILIZER

John K. Lencke and Herman Schmid, Kingston, N. Y.

Application January 22, 1932, Serial No. 588,108

1 Claim. (Cl. 280—89)

This invention relates to improvements in steering stabilizers for vehicles and has for an object the prevention of right and left motion of the front wheels of a motor vehicle, a motion commonly termed "shimmying."

Another object is to provide a steering stabilizer having a friction member of arcuate form engaging the tie rod of the steering gear of a motor vehicle.

A further object of the invention is the provision of a steering stabilizer of few parts and of rigid construction, and easily attached to existing vehicles.

For the sake of illustration, the device will be herein shown and described as applied to the front axle, the tie rod and the front wheel spindles associated therewith as used in connection with the steering gear of a motor vehicle.

In the accompanying drawing illustrating the device:

Figure 1 is a diagrammatic sketch of a motor vehicle axle and tie rod with the improved stabilizer thereon;

Figure 2 is a view of the engaging element of the device and its supporting arm;

Figure 3 is a bottom view of that portion of the device shown in Figure 2;

Figure 4 is a view of the clamps used with member shown in Figures 2 and 3;

Figure 5 shows the member in Figure 2 complete with clamps;

Figure 6 is a view of a stabilizer having a two bolt clamp; and

Figures 7 to 10 inclusive illustrate the method of mounting the device on various arrangements of vehicle axles.

The stabilizer, Figure 5 consists of a main clamp member 10 and an oppositely disposed clamp member 11. The member 10 has a gripping jaw 12 and the member 11 has a gripping jaw 13 for gripping the axle 14 of a vehicle when drawn together by a bolt 15 and a nut 16 passing through the holes 17 and 18 in the members 10 and 11.

The main clamp member 10 is provided with an extended portion 19, provided with flanges 20 and 21 to form a channel as shown in the sectional view in Figure 4 and the portion 22 between is serrated or toothed.

The engaging member 23 has a supporting arm 24 with an upper serrated or toothed surface 25, and a longitudinal slot 26 therethrough, and, if desired, may be eliminated entirely by making the element 23 and the arm or shank 24 perfectly rigid with each other, as is obvious to one skilled in this art.

The supporting arm 24 is bolted to the extended portion 19 of the main clamp member 10 with the respective serrated surfaces 22 and 25 engaging each other to prevent slipping. Suitable bolts 27 and 28 are provided for securing these parts together, and the flanges 20 and 21 prevent the supporting arm 24 from moving laterally.

The engaging member 23 is arcuate in form, the portion 29, 30, 31 being in the form of an arc of a long radius. At right angles to the arcuate portion the engaging member 23 is of substantially semi-circular cross section.

The engaging member 23 has a mounting arm 32 with ears 33 and 34 integral therewith which are bent around and partly embrace the supporting arm 24 as shown in Figures 2 and 3.

Rivets 35, 36 and 37 are provided for securing the mounting arm 32 to the supporting arm 24. The rivet 35 passes through the mounting arm 32, the supporting arm 24 and the washer 40 and is loosely riveted so that the mounting arm 32 can swivel slightly on the arm 24 using the rivet 35 as a pivot pin. The space between the ears 33 and 34 is greater than the width of the supporting arm 24 and rivets 36 and 37 passing through the ears 33 and 34 respectively, limit the swivel motion. This motion is limited by the diameter of the holes 38 and 39 in the supporting arm 24 through which the rivets 36 and 37 respectively also pass. For a very small motion these holes 38 and 39 would be slightly larger in diameter than the rivets and it is obvious that if these holes are increased in diameter a greater swivel motion can be obtained. However, in the preferred form this motion is slight.

This action will be more clearly understood by the inspection of Fig. 1 where the rod 42 is shown connected by pinning its ends to arms which are rigid with the spindles or steering knuckles 43 and 44; said arms being joined to the steering knuckles to one side of the vertical axes of the latter on the sides toward the middle of the axle 14. Hence, as the rod 42 is moved from one side of the car towards the other side, it does not remain parallel with the axle 14, but first one end and then the other of this rod moves a bit nearer to the axle 14. For example when the rod 42 moves to the left, with reference to Fig. 1, the end of the rod shown at the left in this figure first moves a bit farther away from the axle 14 while the end of the rod shown at the right moves a bit closer. When the rod moves in the opposite direction, the end of the rod shown at the right in Fig. 1, will then move a bit farther away from the axle, while the other end moves a bit closer to the axle. Thus the middle of the rod tends to move in a curve and the shape of the engaging element 23 is made to conform to this curve. The result is that wear is even on both the rod and the friction lining 41 on the concave side of the element 23.

Suitable brake lining or frictional material 41 is provided on the inner surface of the engaging member 23 to provide friction between the engaging member 23 and the tie rod 42 of the steering gear of a motor vehicle. These members have lugs or projections 45 substantially in the plane of the extension 19, and perforated to enable the bolts 10a to be passed therethrough, and the member 11a also has projections 47 to brace this jaw against the extension 19 when the nuts 16a are tightened.

In mounting the device on a vehicle, for example a Ford car, the gripping jaws of the clamp members 10 and 11 engage the axle 43 at preferably the mid-point thereof as shown in Figures 1 and 7 and are securely clamped thereto by means of the bolt 15 and the nut 16. The bolts 27 and 28 are left loose so that the supporting arm 24 may be easily moved. Then the steering gear (not shown) which transmits motion to either one of the spindles 43, 44 or to the tie rod 41 is turned until the front wheels (not shown) which are carried on the spindles 43, 44, are straight in line with the rear wheels of the vehicle. Then the engaging member 23 with its supporting arm is pushed forward until it engages the tie rod 42. Then the steering gear is turned, swinging the wheels out of line with the rear wheels whereupon the tie rod 42 moves away from the engaging member 23 and the engaging member and its supporting arm 24 is moved forward $\frac{3}{16}$ of an inch and secured in this position by the bolts 27 and 28 and the device is ready for use.

When the wheels are set for straight forward travel the tie rod 42 is engaged by the member 23 under a tension, due to the $\frac{3}{16}$ of an inch set-in of the engaging member and the tie rod is thereby slightly "bowed", and this rod is in engagement with the member 23 when making ordinary turns with the car due to the arcuate form of the member 23 and the slight swivel motion between this member and its supporting arm 24.

This is an improved feature in that in making ordinary turns at only slightly decreased speed the driver has the added safety of the stabilizer action in making these turns whereas with the present types of stabilizers, the effective stabilizing action is only present when the car is traveling straight forward.

Another feature of the improved device described and claimed herein is that the surface of the friction material 41 has the wear distributed over its surface from end to end due to its arcuate form and the slight swivel action whereas the friction material in the present types of stabilizers shows excessive wear at each end thereof and practically no wear of the surface between the ends. This feature gives long life to the device without the need of frequent readjustment.

The device shown in Figure 6 is made more massive and the clamp members 10a and 11a are clamped by bolts 15 and 15a and nuts 16 and 16a respectively and is suitable for heavier types of vehicles.

Figures 8, 9 and 10 show modifications of the device to make it adaptable for mounting on vehicles having different axle and tie rod arrangements.

Many other modifications may be made in this device without departing from the spirit of the invention as described in this specification and covered by the appended claim.

What is claimed is:

A stabilizing attachment for the steering connections including a tie rod on a motor vehicle, said rod being connected to the steering knuckles at the ends of the front axle of said vehicle so that as the rod is moved to turn the front wheels of said vehicle its mid portion tends to describe a curve which is convex towards said axle, said attachment comprising an arm secured to the axle adjacent the middle thereof and extending toward the tie rod and a concave element attached to the outer end of said arm in position to engage with the tie rod and being curved from one end to the other to conform with the curve described by the mid portion of the tie rod in its movement, said element having a friction lining on the face thereof which engages the tie rod, whereby uneven wear on said tie rod and said lining is prevented.

JOHN K. LENCKE.
HERMAN SCHMID.